United States Patent
Noraev et al.

(10) Patent No.: US 7,249,083 B2
(45) Date of Patent: Jul. 24, 2007

(54) SECURITIES, SUPPORTING SYSTEMS AND METHODS THEREOF

(75) Inventors: Dmitry Noraev, Chatham, NJ (US); Arturo Ortiz de Zevallos, Jersey City, NJ (US)

(73) Assignee: Lehman Brothers Holdings Inc., New York, NY (US)

( * ) Notice: Subject to any disclaimer, the term of this patent is extended or adjusted under 35 U.S.C. 154(b) by 0 days.

(21) Appl. No.: 10/789,920

(22) Filed: Feb. 27, 2004

(65) Prior Publication Data

US 2004/0215541 A1  Oct. 28, 2004

Related U.S. Application Data

(60) Provisional application No. 60/464,371, filed on Apr. 22, 2003.

(51) Int. Cl.
*G06Q 40/00* (2006.01)
(52) U.S. Cl. ...................... 705/36 R; 705/35
(58) Field of Classification Search ............... 705/35, 705/37, 36, 36 R
See application file for complete search history.

(56) References Cited

U.S. PATENT DOCUMENTS

2003/0135446 A1* 7/2003 Birle, Jr. et al.

2004/0098327 A1* 5/2004 Seaman ....................... 705/36

FOREIGN PATENT DOCUMENTS

GB  WO 2004/021120 A2 *  3/2004

OTHER PUBLICATIONS

Middlemiss, Jim. "Next on the Fix Hit List: Bonds and Derivatives". Wall Street & Technology. New York: Apr. 2003. p. 23, 2 pgs.*

* cited by examiner

*Primary Examiner*—Lalita M. Hamilton
(74) *Attorney, Agent, or Firm*—Morgan, Lewis & Bockius LLP; Steven D. Underwood, Esq.

(57) ABSTRACT

A financial instrument, equity dilution inhibitor and security upgrade account are disclosed based on an enhanced call-spread option. Implementation of the investment vehicle and/or upgrade account are managed via program controlled data processor governing system operation in accordance with investment parameters. Enhanced flexibility for this investment vehicle increases its usefulness to a broad spectrum of potential investors.

8 Claims, 7 Drawing Sheets

Fig. 1a – Traditional SHiPS℠

Fig. 1b – Traditional SHiPS℠ (example)

Fig. 2a – Issuer Installment SHiPS℠

Fig. 2b – Issuer Installment SHiPS℠ (example)

Fig. 3b – Investor Installment SHiPS℠ (example)

Fig. 4 – System Account Management Logic Flow Diagram

SECURITIES, SUPPORTING SYSTEMS AND METHODS THEREOF

This application claims the benefit of provisional application Ser. No. 60/464,371 filed Apr. 22, 2003, which application is incorporated herein by reference in its entirety.

FIELD OF THE INVENTION

The present invention is generally directed to a select group of novel security structures utilized in support of certain investment objectives. More particularly, the present invention is directed to an enhanced equity linked security structure and the systems and methods for implementing the security.

BACKGROUND OF THE INVENTION

Corporations raise capital in a number of different ways, issuing equity and equity linked products being some of the most common ones.

One popular instrument used to raise capital is known as the "convertible bond." Much like a regular bond, a convertible bond entitles a holder to periodic coupon payments as well as the repayment of the principal amount at maturity. In addition, the holder has the right to convert his bond to a specified number of underlying shares, thus participating in the performance of the company's shares. The stock price at which it becomes economical for convertible bond holders to convert their bonds into the underlying shares is known as the conversion price. The recently published article in *The Economist* (Jul. 19, 2003, pp. 59-60), describes the convertible bond as "in effect, two financial securities in one: a bond, plus a call option on the shares." While this description is not entirely accurate, it is sufficient for our purposes. The combination of the relative safety of regular bonds with the potential upside participation in the underlying shares renders convertible bonds an attractive instrument for investors.

A convertible bond issuer can significantly reduce the cost of capital compared to that of conventional debt by offering investors the upside participation in the underlying equity appreciation. The downside is that the potential conversion of the bond into shares may increase the number of outstanding shares of the company, thus reducing earnings per share. This phenomenon is known as "dilution."

Several mechanisms have been pursued to partially reduce the risk of dilution inherent in convertible bonds and other similar instruments. The ideal way for a company to eliminate dilution would be to buy an offsetting call option (the right to purchase stock on a future date at a specified strike price) on the underlying shares struck at the conversion price. While this method would eliminate the dilution entirely, it would also negate all the benefits of convertible bond issuance, since the premium spent on a call option would cancel the benefits of cheaper funding rate achieved by an issuer through the issuance of convertible bond.

The next best solution for a convertible bond issuer is to buy (go long) a call option struck at the conversion price and sell (go short) a call option struck at a higher stock price. Such combination of long lower-strike call and short higher-strike call is commonly referred to as a callspread. For the purposes of this invention the expirations of the two calls comprising a callspread may or may not be the same. Additionally, the number of lower-strike calls in the callspread may or may not be the same as the number of higher strike calls. The price of a callspread is generally lower than that of a plain call option struck at the same lower strike.

Figure 1A:
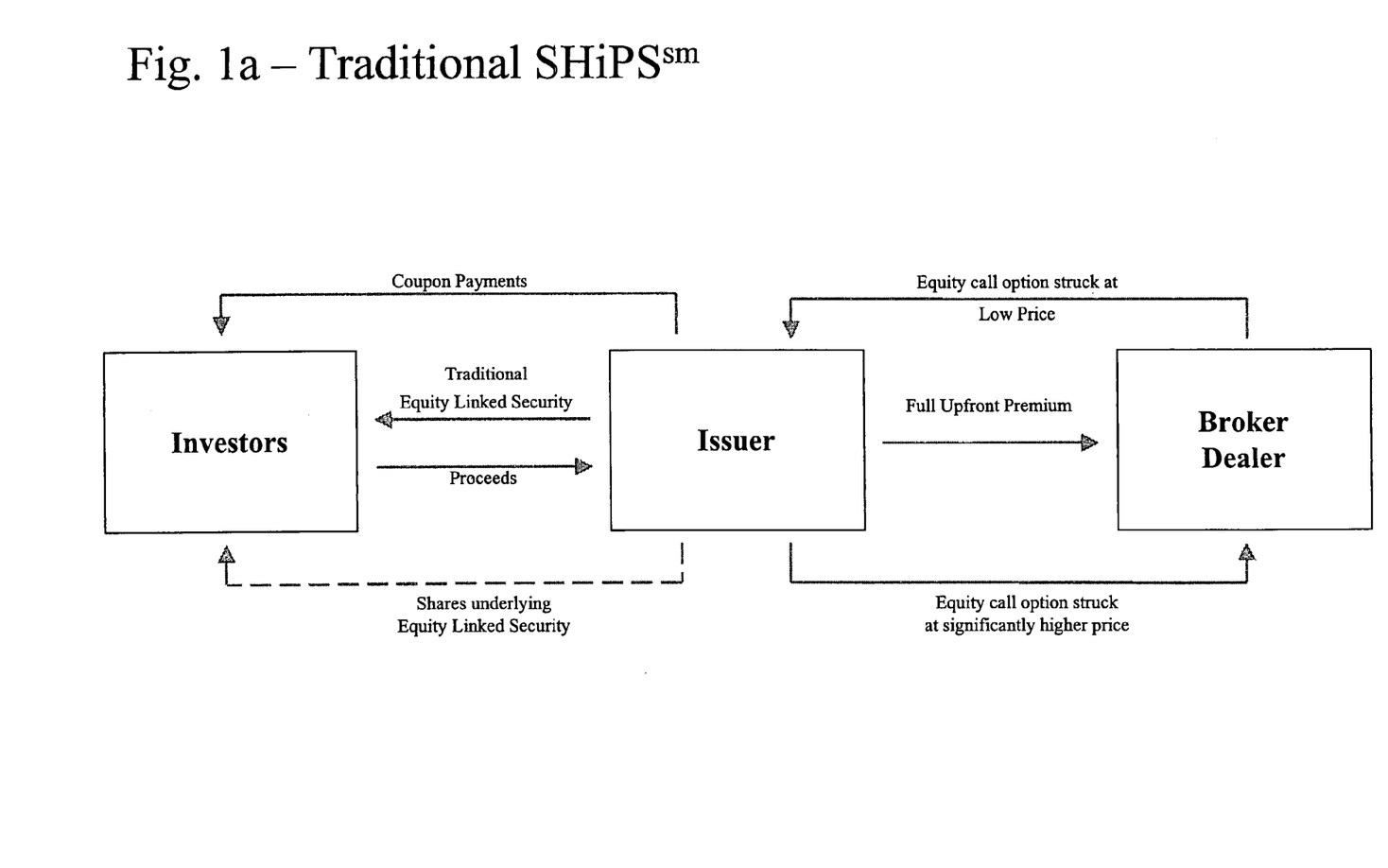
FIG. 1a is a schematic block diagram that depicts the general use of a callspread option to prevent dilution.

As a result of such callspread purchase, an issuer effectively "shifts" the dilution problem to a higher stock level which is more tolerable for existing shareholders. FIG. 1a illustrates the use of a callspread as a tool to reduce the dilution when issuing an equity-linked note. Here the Issuer issues an Equity Linked Security to investors in which the Issuer provides the Investors with the ability to participate in the equity performance. In exchange for this the Investors will generally agree to receive lower coupon payments. The Issuer will then use part of the profits from the issuance to purchase a callspread option (as described above) from a Broker Dealer in order to increase its protection against potential dilution. When the shares underlying the Equity Linked Security appreciate in value, Investors will exercise their right to convert in which case the Issuer will exercise its callspread option thus receiving the shares from the Broker Dealer.

The specifics of callspread trading is well understood by people proficient in the field of financial derivatives and are described in detail in "Option Volatility & Pricing: Advanced Trading Strategies and Techniques" by Sheldon Natenberg, McGraw-Hill, 1994, pp. 203-211, incorporated herein by a reference.

Figure 1B:
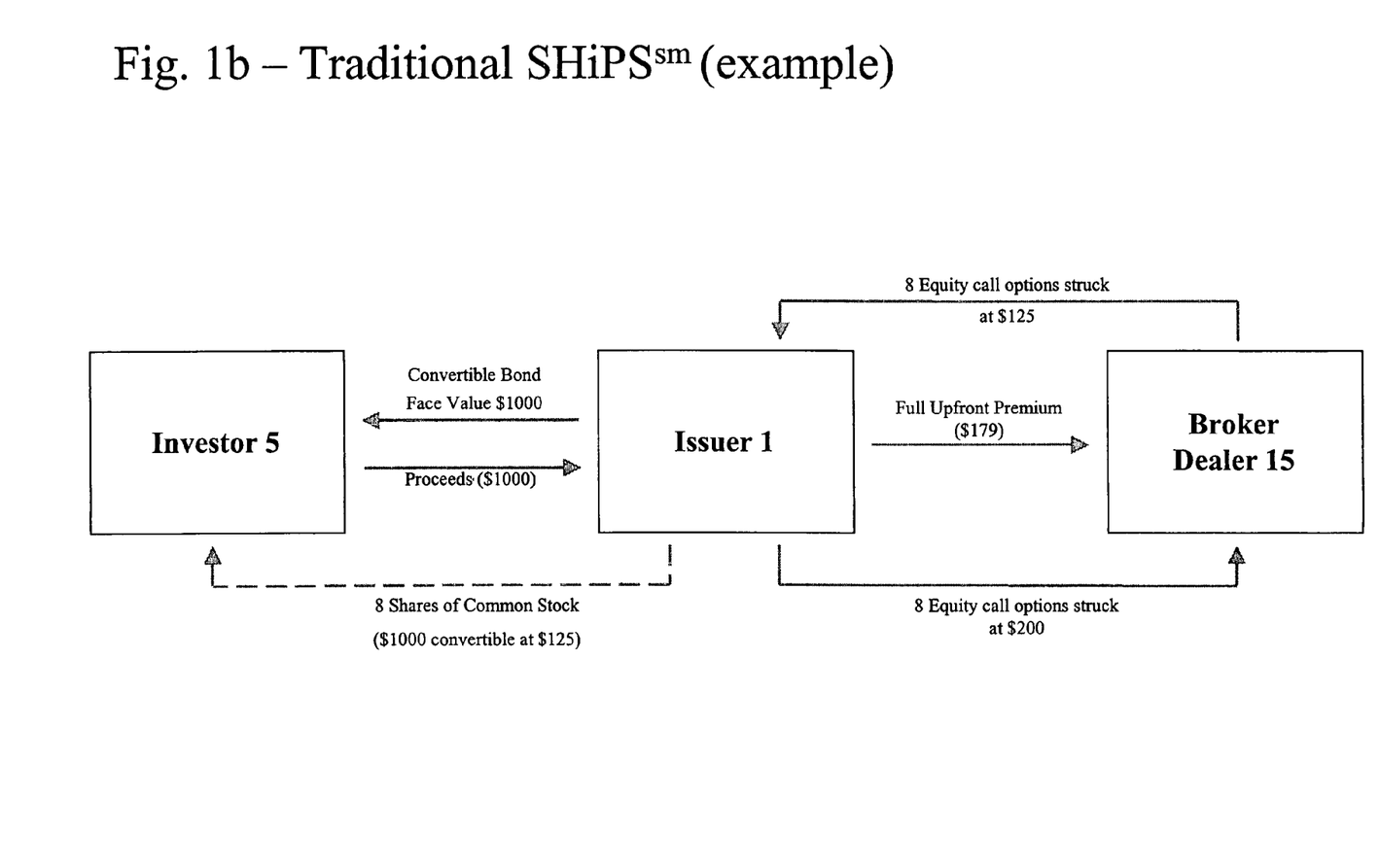
FIG. 1b, provides a numeric example for FIG. 1a specifically applied to a convertible bond.

A specific example of how a callspread purchase may be used by a convertible bond issuer to mitigate dilution is found in FIG. 1b. In this diagram, a convertible bond is issued by Issuer 1 to Investor 5. The notional of the bond is $1000. The assumed stock price on the day of the convertible bond issuance is $100. Without the loss of generality, we can assume that the convertible bond pays no coupons, i.e. investors are willing to forgo the interest payments entirely in exchange for the upside participation in the underlying stock (this is not unusual for convertible bond issuances). We further assume that the bond may be converted into 8 shares of common stock at any time prior to maturity. Assuming that both the interest rates and the issuer's credit status remain constant, it will become economical for the investor to convert his $1000 notional bond into 8 shares of common stock if the stock is above $1000÷8=$125. The issuer is therefore faced with potential equity dilution if the stock exceeds the conversion price of $125. Issuer 1 reduces his potential dilution by purchasing a callspread from Broker-Dealer 15. The callspread comprises a call option struck at the conversion price $125 bought by Issuer 1, and a call option, struck at a significantly higher price of $200 bought by Broker-Dealer 15. While in the general case, it is not necessary to match expirations of either call option with the maturity of the bond, for the purposes of this example, we assume the expiration of both options to coincide with the maturity of the convertible bond. For the purposes of this example, we assume that the number of lower strike calls is the same as the number of higher strike calls. Having entered into such arrangement with Broker Dealer 15, Issuer 1 has now effectively shifted the dilution risk from the original $125 to a much higher price of $200.

The fees associated with the callspread are determined using various per se well-known pricing models on options (see, e.g., Options, Futures, and Other Derivatives by John C. Hull, Prentice Hall, Third Edition, 1997, the contents of which are incorporated herein by reference). Various hedging techniques are thereafter employed by the callspread seller to reduce the risk associated with the transaction.

Similar investment arrangements have recently been implemented on a commercial basis as outlined below in a published excerpt:

"Computer Associates, Cypress Protect Shareholders From Dilution
2003-06-23 03:01 (New York)
June 23 (Bloomberg)—Computer Associates International Inc. and Cypress Semiconductor Corp. are among companies that have borrowed money with the expectation that their shares would rise, and they covered their bets in case they guessed right.

These companies and others including Navistar International Corp. and Micron Technology Inc. have raised money by selling convertible bonds, which are repaid in stock instead of cash if their seller's shares rise to a set price.

Handing over a pile of shares has a drawback: dilution that cuts the value of stock investors hold already. To protect those shareholders, the companies are spending as much as 16 percent of their bond sale proceeds to buy call-spread options. These let companies purchase enough stock at a preset price to help counter the reduction in per-share profit investors would take otherwise.

"For companies who are bullish on their stock and want to minimize dilution, call-spread options are an attractive feature to augment a convertible deal," said Steve Wachtel, technology analyst at Froley Revy Investment Co., a Los Angeles-based money manager that specializes in convertible debt."

A substantially similar strategy can be utilized by a convertible bond investor. In this case, the investor may choose to buy a callspread from a Broker-Dealer to reduce the conversion price of a convertible bond and increase the probability of conversion into the underlying shares.

The investment vehicles described above have at least two significant drawbacks that may limit their appeal to a wider spectrum of potential users. First, the cost of the callspread option can be significantly high. And second, the benefit of the dilution protection may become irrelevant if the market price of the underlying stock decreases substantially, since the possibility of achieving the conversion price becomes very remote. Similarly, the opportunity for a convertible bond investor to benefit from the conversion rights associated with the convertible bond are far more attenuated if the market price of the underlying equity drops.

OBJECTS AND SUMMARY OF THE PRESENT INVENTION

It is, therefore, an object of the present invention to provide a novel investment vehicle that combines cost efficiency with flexibility for raising capital while limiting the potential for stock dilution.

It is another object of the present invention to provide a lower cost of capital to corporate entities seeking to raise funds in the market.

It is yet a further object of the present invention to provide a novel security which favorably alters the effective conversion price for the convertible bond issuer.

It is yet another object of the present invention to provide a convertible bond synthetic security that permits reduced exposure to share-equity dilution to current shareholders.

It is still another object of the present invention to provide a data processing system to assist in implementing and managing a select synthetic security.

It is a further object of the present invention to provide a convertible bond investor an investment holding that favorably alters the effective conversion price of a convertible bond at significant cost savings.

It is another object of the present invention to provide a portfolio of financing arrangements for implementing call-spread options associated with equity-linked investment offerings.

The above and other objects of the present invention are realized in novel investment instruments that stem from and supplement convertible bonds and similar equity-linked securities.

In one illustrative arrangement, a convertible bond is linked to a callspread option structured to increase the effective conversion price for a convertible bond issuer. The callspread option is financed by a stream of periodic payments from the Issuer to the option Seller. The option further comprises a "walk-away" (cancellation) provision in which the purchaser of the callspread can choose to dissolve it at any time prior to exercise. Upon elective cancellation by the callspread buyer, the remaining periodic payment obligations are also dissolved.

A second arrangement involves a convertible bond or other equity-linked security linked to a callspread option structured to decrease the effective conversion price for a convertible bond Investor. The callspread option is similarly financed by a stream of periodic payments from the Investor to the option Seller. Again, the option further comprises a cancellation provision by the Investor that dissolves the option at any time prior to exercise and eliminates the remaining periodic payment obligations.

In another variation, the Holder of a convertible bond may surrender the bond coupon payments to the callspread option Seller, in lieu of required periodic payments, in exchange for a lower effective conversion price for the bond. In this variation, information regarding the bond, including coupon rate, expiration date, and original conversion price are collected and used to calculate the lowered conversion price for the bond.

In accordance with the varying aspects of the present invention, supporting systems augment the implementation of the inventive investment vehicles. This includes the tracking and reporting obligations associated with managing these investment accounts, and furthermore, the risk management and/or hedging undertaken by the system administrator to insure profitable handling of the accounts. Typical risk management procedures include, per se, well-known delta hedging techniques implemented on a periodic basis.

BRIEF DESCRIPTION OF THE FIGURES

For a more complete understanding of the specific embodiments, FIGS. 1-4 are provided as illustrations relating to the practice of the present invention, wherein:

DETAILED DESCRIPTION OF THE INVENTION

First briefly by way of background, the present invention is directed to a novel investment vehicle for increasing the flexibility of select convertible bonds and other equity-linked securities. The inventive investment is best illustrated as the coupling of a convertible bond with a callspread option corresponding to the same underlying asset. The payment for the callspread option, in one variation of the invention, is spread over a select time period and permits exchange rights based on events that accrue within the pre-selected time span. This innovative investment provides the purchaser the flexibility of canceling the investment and avoiding any future payments at any point in time. This is extremely significant since market conditions may change making the original intention of the investment irrelevant.

Implementation of the investment vehicle is accomplished on a program controlled data processing system, operated by the system administrator. Functional characteristics of the system include the tracking of select investment events and market conditions associated with the underlying asset. Additional operation encompasses traditional hedging techniques to allow proper risk management.

Previously, the schematic block diagram depicted in FIG. 1a was discussed with regard to the general use of the callspread option in conjunction with an equity-linked security. In FIG. 1b, a similar form of diagram is used to delineate the processes associated with implementing variations on the callspread option that can be applied to a convertible bond.

The strategies described in FIGS. 1a and 1b have many disadvantages, one of the most significant being that upfront payments for callspread purchase tend to be rather high. In addition, market conditions may significantly change rendering the previously purchased callspread irrelevant (i.e., a significant drop in the price of the underlying security). To overcome the disadvantages of the plain callspread usage in conjunction with the equity-linked security issuance, an innovative structure is described in FIG. 2a. Similar to FIG. 1a the Issuer issues an Equity Linked Security to Investors in which the Issuer provides the Investors with the ability to participate in the performance on the underlying equity. In exchange for this the Investors will generally agree to receive lower coupon payments. The Issuer will then use part of the profits from the issuance to purchase an Installment callspread option to increase its protection against potential dilution. This innovative structure exhibits a lower upfront premium than a regular callspread option. The issuers of convertible bonds or other Equity Linked securities have many immediate uses for the cash they raise in their issuances, so the reduced upfront premium is an extremely attractive alternative. This is achieved via a financing arrangement in which the purchaser of this Installment callspread (the Issuer) will make a series of "knock-out" prevention coupon payments to the Installment callspread seller (Broker Dealer) throughout the life of the trade. In addition the callspread buyer has the ability to "walk-away" from the callspread by terminating the "knock-out" prevention coupons. This provides another great advantage over regular callspreads since it provides the Issuer the option to instantly "walk-away" without any further payments or obligations in the event that market changes make the callspread overlay irrelevant.

Figure 2A:
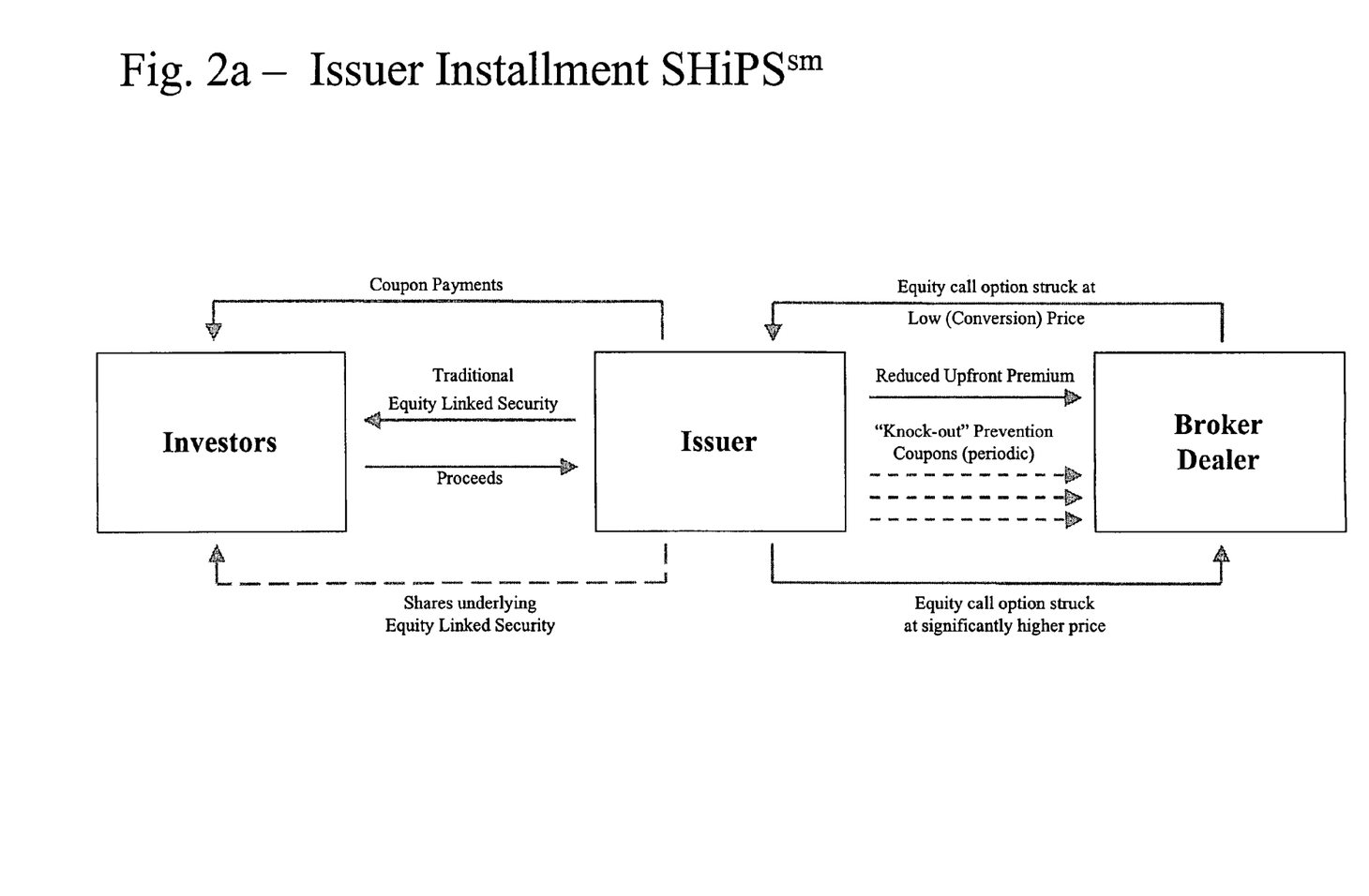
FIG. 2a is a schematic block diagram delineating the use of installment payments by an Issuer to increase the conversion price of an equity-linked security and reduce potential equity dilution.
Figure 2B:
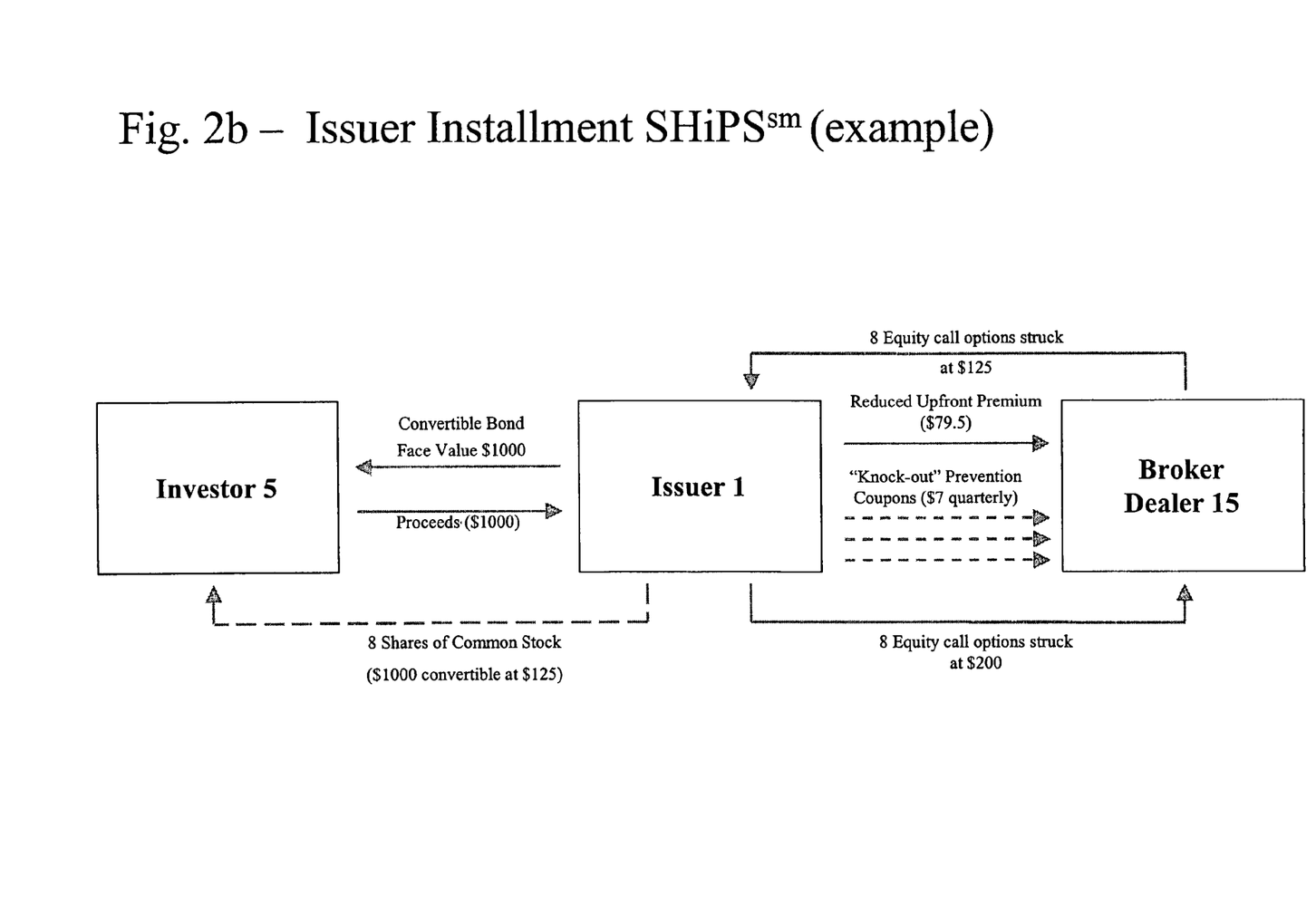
FIG. 2b depicts a numerical example for FIG. 2a specifically applied to a convertible bond security.

FIG. 2b offers a numerical example of the general case described in FIG. 2a. Here, Issuer 1 issues a convertible bond having a conversion price of $125. The overlay callspread option has a strike price of $125, with a return call option at $200. To finance the overlay, Issuer 1 pays Broker/Dealer 15 a stream of payments over the contract life, forming an installment structure, therefore substantially reducing the up-front costs of this arrangement. Moreover, as market conditions may warrant, e.g., a substantial drop in share price, the installment structure provides a "walk-away" provision for Issuer 1 (illustrated by the dotted lines). This provision allows Issuer 1 to terminate the callspread and eliminate the remaining installment payments.

Figure 3A:
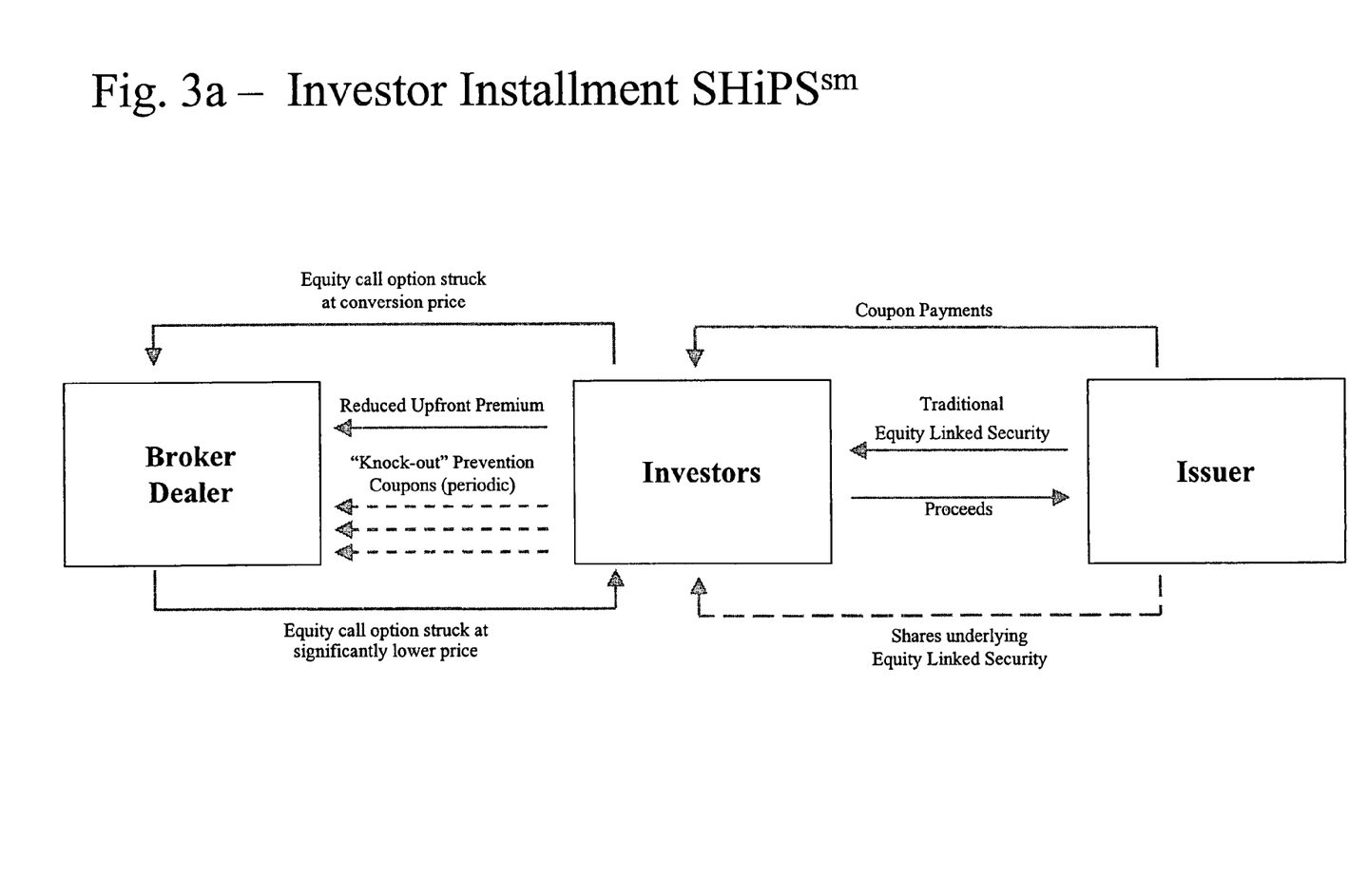
FIG. 3a is a schematic block diagram delineating the use of installment payments by an Investor to decrease the conversion price of an equity-linked security thus enhancing the potential for upside equity participation.

In FIG. 3a we observe the use of this innovative Installment strategy for the benefit of an Investor in an Equity Linked Security. Here the Investor can choose to purchase an Installment callspread from a Broker Dealer in order to reduce the level at which they begin to participate in the Equity appreciation. The Investor will pay a lower upfront premium than for a regular callspread with the same terms, by agreeing to make a series of installment coupon payments throughout the life of the transaction. Again, as in the strategy described above the Investor will retain the right to "walk-away" from the trade by ceasing to pay the "knock-out prevention" coupons. This allows the Investor to avoid further payments in the event market conditions significantly change making the callspread option irrelevant.

Figure 3B:
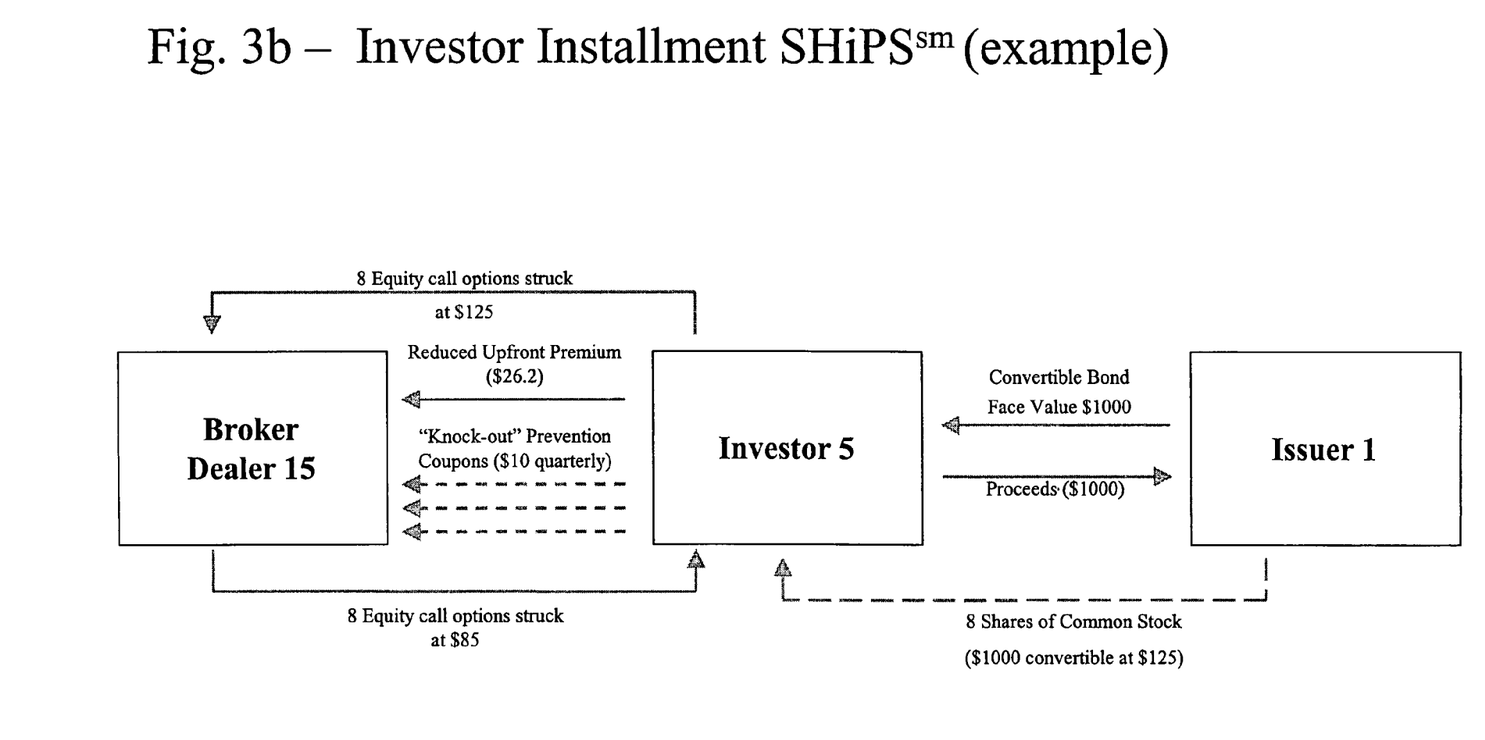
FIG. 3b depicts a numerical example for FIG. 3a specifically applied to a convertible bond security.

In FIG. 3b a specific example of how a convertible bond Investor can benefit from this innovative security is depicted. The convertible bond Investor 5 holds a convertible bond having a conversion price of $125. The overlay callspread option has a lower strike of $85 and a higher strike of $125. Investor 5 pays a stream of payments to Broker-Dealer 15 forming an installment structure. Again, if a drop in the market stock price renders future conversion improbable, Investor 5 may choose to terminate the remaining installment payments, thereby extinguishing the callspread option. In FIG. 3a we present the general case that can be applied to any Equity Linked Security.

Figure 4:
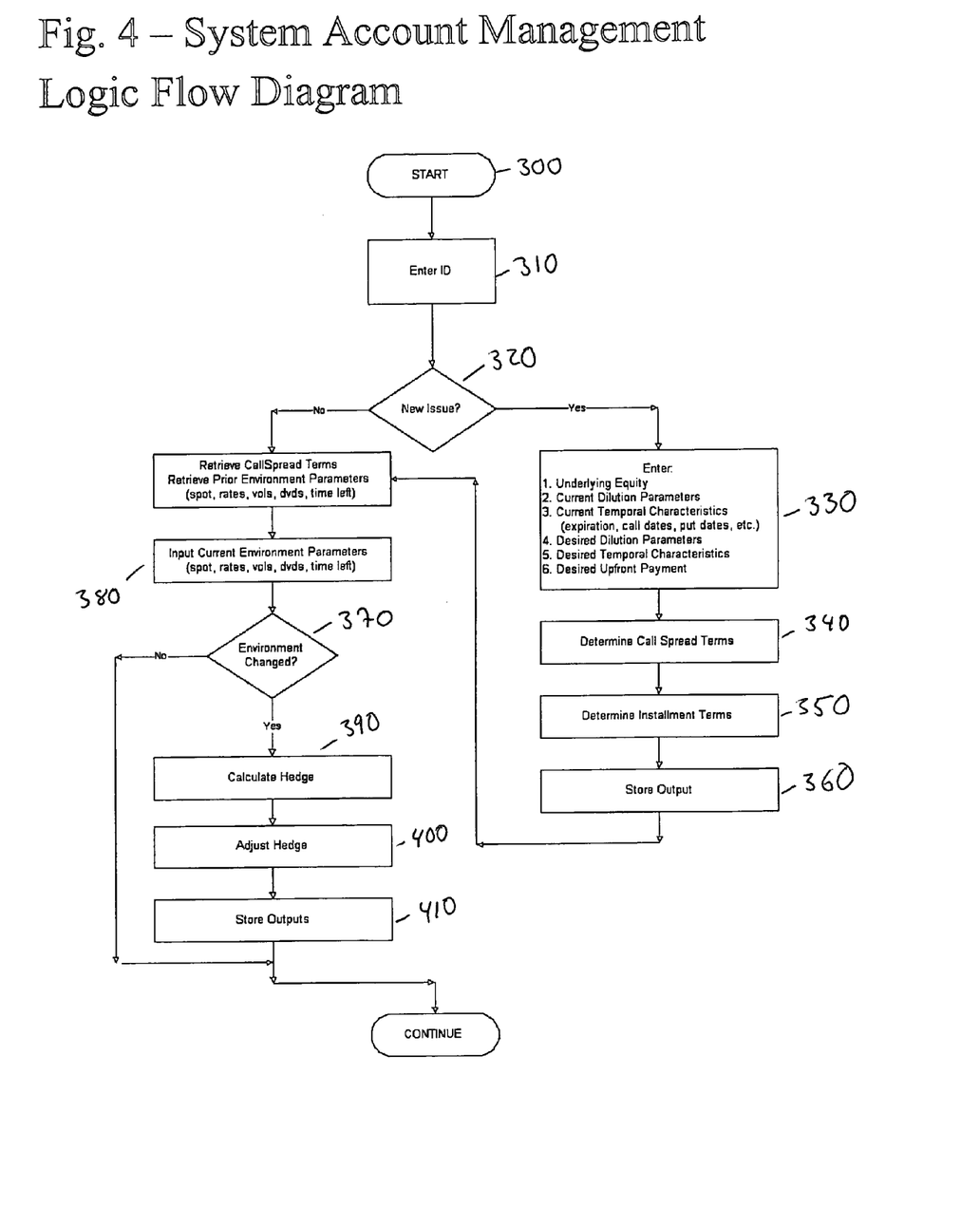
FIG. 4 is a logic flow diagram illustrative of a system account management.

In FIG. 4, a logic flow chart depicts a processing system associated with the present invention. This Figure depicts a high level of governing logic for purposes of simplified illustration, recognizing actual system design will involve substantially more in terms of processing details as will be readily recognized by persons skilled in this art. While it is expected that the system will encompass a program controlled computer residing on a network based communication platform, details regarding operating systems, hardware specifications, resident applications, and data transfer protocols are a matter of design choice, selected to meet the business volume and associated processing needs of the intended user. The logic begins conceptually at block 300, and the data for a select client, Client (I) is entered in block 310. In this logic diagram, two types of data are processed: "New Issues," and "New Events". The variables "I" and "J" are counters for sequential indexing of entries. New Issues are assessed at test 320, with a positive response branching logic to block 330. At this point, the system is recognizing a new potential equity-linked security "Issue" and calculates the parameters associated therewith. In this illustration, this involves the calculation of the callspread option pricing details, block 340, transforming this into an installment financing arrangement, block 350 and storing these parameters for later assignment, block 360.

The logic continues to assess new "Events," test 370. Illustrative events include the issuance of the convertible bond by a client, the tracking of market price changes for the underlying asset, the payment of installments, the surrender of the callspread option, etc. (without being exhaustive). Each Event entered, block 380, potentially affects the Issuer/Broker relationship, block 390, and the various risk management techniques undertaken in the market, viz. "hedge (J)," at block 400. Typically, hedging is accomplished by delta hedging techniques applicable to option management. (see, e.g., Options, Futures, and Other Derivatives by John C. Hull, Prentice Hall, Third Edition, 1997, pp. 312-320). Updated details are stored in memory, block 410, and the processor moves to the next entry, via index variable.

Similar processing logic (not shown) applies to the application of an installment callspread to reduce the effective conversion price as seen by a convertible bond Investor. This processing determines the installment payment stream associated with the convertible bond and the reduction in effective conversion price corresponding to the installment payments.

The foregoing infrastructure is highly flexible and can be modified to address current and future market conditions. For example, the installment payment can be in cash, some other form of security, such as stock, or a derivative instrument. The ratio of the callspread can depart from 1:1, for the long v. short options. The option expiration date may be concurrent or set at some pre-set interval for the two option contracts.

Other variations are set between the parties. For example, the walk-away right under the installment structure may reside solely with the buyer, or may be automatically triggered, e.g., the underlying security dropping below a pre-set price point, or a corresponding drop in credit rating for the bond.

The above description is merely illustrative of select embodiments of the present invention and does not, in any way, act to restrict the variations available to accomplish the inventive features therein. The foregoing inventions are solely limited by the appended claims on this patent.

What is claimed is:

1. A computer implemented method for creating an investment vehicle, comprising:

creating via software stored on a computer a debt security providing a fixed income return to a purchaser for a pre-set period of time that further provides to said purchaser an equity conversion arrangement for a select underlying equity security based on future contingent events; and creating via software stored on said computer a derivative instrument coupled to, but separate from, said debt security by providing an option to an issuer of said debt security to purchase shares of said equity security at a select price at a future date, wherein said derivative instrument may be canceled by said issuer prior to said future date and said issuer is obligated to make payments for said derivative on an installment basis, with future payment obligations of said issuer extinguished upon cancellation with no penalty to said issuer for said cancellation.

2. The method of claim 1 wherein the debt security is a convertible bond.

3. The method of claim 2 wherein the underlying equity security is for equity in an issuer of said convertible bond.

4. The method of claim 3 wherein said derivative instrument is a callspread option having a strike price equal to a conversion price of said convertible bond.

5. The method of claim 1 wherein the future contingent event is matching a price of said underlying equity to a pre-set value.

6. A data processing computer system for implementing and managing investment vehicles configured to alter equity dilution on select debt instruments, said system comprising:

a. a data input and storing platform in communication with information relating to debt securities linked to equity securities, including total amount, yield, and conversion price of said debt securities;

b. a processor connected to and in communication with said input and storing platform for receiving said information and selectively creating an investment vehicle, wherein said investment vehicle favorably alters risk of equity dilution to an issuer of said debt securities by coupling said debt securities to a callspread option held by said issuer, said coupling comprising an option to purchase shares of said equity security at a select price at a future date, and said processor further provides pricing and hedging information for output to a system user wherein said callspread option is funded by a cancelable payment stream that may be canceled without penalty.

7. The data processing system of claim 6 wherein at least some part of said payment stream is a reversible swap of coupons from said security, in exchange for a lowered, effective conversion price.

8. The system of claim 6 wherein said output includes a hedging position determined from said callspread option.

* * * * *